(12) United States Patent
Bandholz et al.

(10) Patent No.: US 7,962,306 B2
(45) Date of Patent: Jun. 14, 2011

(54) DETECTING AN INCREASE IN THERMAL RESISTANCE OF A HEAT SINK IN A COMPUTER SYSTEM

(75) Inventors: Justin P. Bandholz, Cary, NC (US); Zachary B. Durham, Asheboro, NC (US); Clifton E. Kerr, Durham, NC (US); Joseph E. Maxwell, Cary, NC (US); Kevin M. Reinberg, Chapel Hill, NC (US); Kevin S. D. Vernon, Durham, NC (US); Philip L. Weinstein, Apex, NC (US); Christopher C. West, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/118,158

(22) Filed: May 9, 2008

(65) Prior Publication Data

US 2009/0281761 A1    Nov. 12, 2009

(51) Int. Cl.
*G01K 1/02* (2006.01)
(52) U.S. Cl. .......... 702/132; 165/247; 340/584; 374/45; 374/166
(58) Field of Classification Search .......... 702/132, 702/130; 340/584; 713/300, 322; 361/679.48; 700/2; 374/166, 45; 165/247
See application file for complete search history.

(56) References Cited

U.S. PATENT DOCUMENTS

| | | | |
|---|---|---|---|
| 5,920,264 A | | 7/1999 | Kim et al. |
| 6,020,820 A | | 2/2000 | Chiang |
| 6,491,426 B1 | * | 12/2002 | Schonath et al. ............... 374/45 |
| 6,496,118 B1 | * | 12/2002 | Smith ............................. 340/584 |
| 7,347,621 B2 | * | 3/2008 | Sri-Jayantha et al. ........ 374/166 |
| 2002/0101714 A1 | | 8/2002 | Osecky et al. |
| 2004/0182564 A1 | * | 9/2004 | Tremmel ....................... 165/247 |
| 2005/0216221 A1 | | 9/2005 | Broyles, III et al. |
| 2006/0136074 A1 | * | 6/2006 | Arai et al. ........................ 700/2 |
| 2006/0248359 A1 | | 11/2006 | Fung |
| 2007/0043964 A1 | | 2/2007 | Lim et al. |
| 2007/0097620 A1 | | 5/2007 | Leech et al. |
| 2009/0024349 A1 | | 1/2009 | Boerstler et al. |

FOREIGN PATENT DOCUMENTS

JP    61171157 A    8/1986

OTHER PUBLICATIONS

Follette, et al.; IBM Technical Disclosure Bulletin; Jul. 1978; pp. 567-568; vol. 21, No. 2.
A.P. Dolowitz, et al.; IBM Technical Disclosure Bulletin; Mar. 1982; pp. 5146-5148; vol. 24, No. 10.

* cited by examiner

*Primary Examiner* — John H Le
(74) *Attorney, Agent, or Firm* — Brandon C. Kennedy; Cynthia G. Seal; Biggers & Ohanian, LLP

(57) ABSTRACT

Methods, apparatus, and products for detecting an increase in thermal resistance of a heat sink in a computer system, the heat sink dissipating heat for a component of the computer system, the computer system including a fan controlling airflow across the heat sink, the computer system also including a temperature monitoring device, including: measuring, by a monitoring module through use of the temperature monitoring device during operation of the computer system, thermal resistance of the heat sink; determining whether the measured thermal resistance of the heat sink is greater than a threshold thermal resistance, the threshold thermal resistance stored in a thermal profile in non-volatile memory, and if the measured thermal resistance of the heat sink is greater than the threshold thermal resistance, notifying a system administrator.

18 Claims, 2 Drawing Sheets

DETECTING AN INCREASE IN THERMAL RESISTANCE OF A HEAT SINK IN A COMPUTER SYSTEM

BACKGROUND OF THE INVENTION

1. Field of the Invention

The field of the invention is data processing, or, more specifically, methods, apparatus, and products for detecting an increase in thermal resistance of a heat sink in a computer system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Electrical components of computer systems today typically generate a large amount of heat during operation. If a component is overheated, errors in the computer system may occur including complete failure of the computer itself. To reduce the possibility of overheating components of today's computer systems, heat generated by such components is typically dissipated by a heat sink. Thermal resistance of a heat sink may increase over time which causes efficiency in dissipating component heat to decrease. Such an increase in thermal resistance may be cause by many factors such as, for example, dust build-up on the heat sink. Currently determining whether there is excessive dust build-up on a heat sink in a computer system typically requires powering-down a computer system and manually inspecting the heat sink for dust.

SUMMARY OF THE INVENTION

Methods, apparatus, and products for detecting an increase in thermal resistance of a heat sink in a computer system, the heat sink dissipating heat for a component of the computer system, the computer system including a fan controlling airflow across the heat sink, the computer system also including a temperature monitoring device, including: measuring, by a monitoring module through use of the temperature monitoring device during operation of the computer system, thermal resistance of the heat sink; determining whether the measured thermal resistance of the heat sink is greater than a threshold thermal resistance, the threshold thermal resistance stored in a thermal profile in non-volatile memory, and if the measured thermal resistance of the heat sink is greater than the threshold thermal resistance, notifying a system administrator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
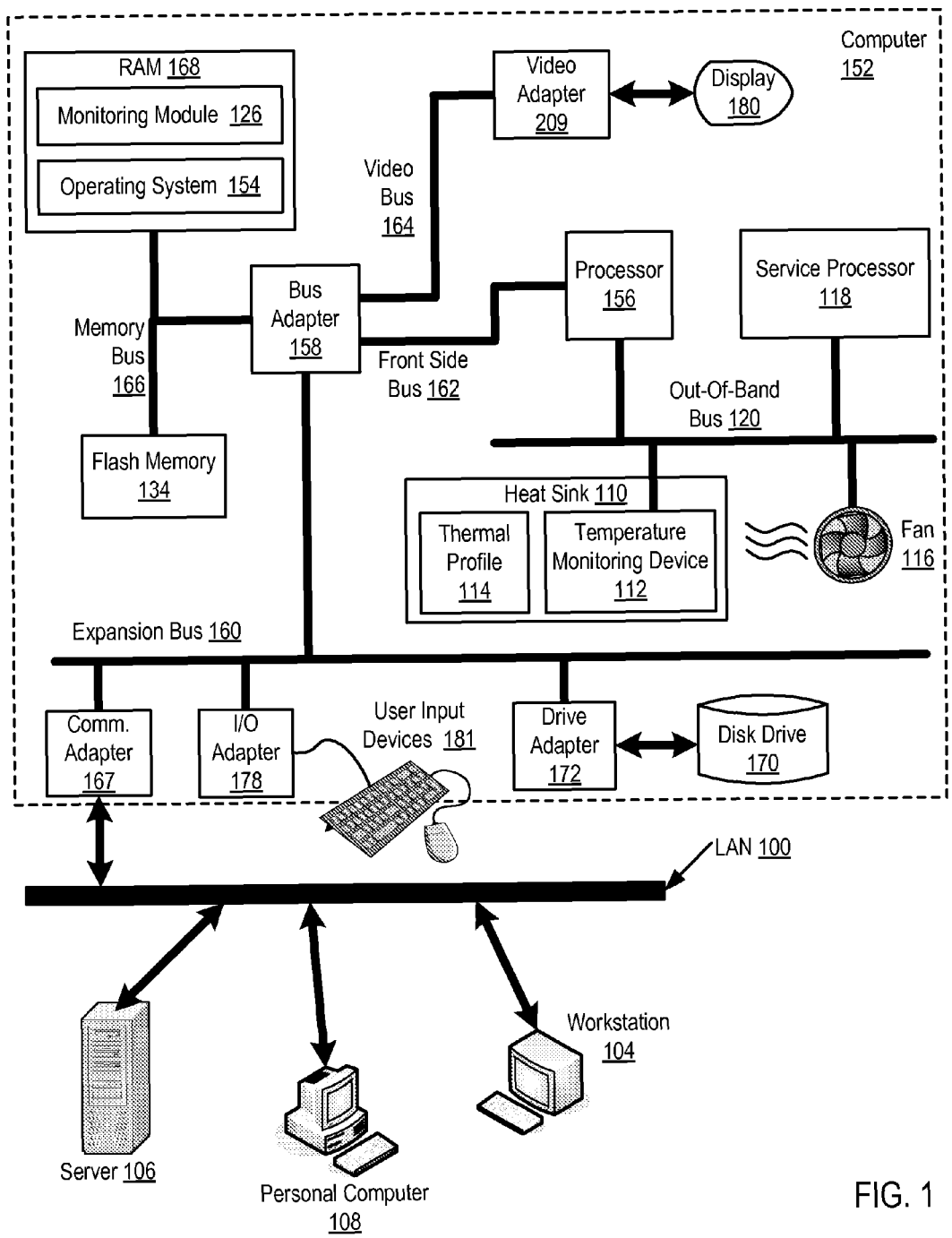
FIG. 1 sets forth a functional block diagram of an example system useful for detecting an increase in thermal resistance of a heat sink in a computer system according to embodiments of the present invention.

Exemplary methods, apparatus, and products for detecting an increase in thermal resistance of a heat sink in a computer system with the present invention are described with reference to the accompanying drawings, beginning with FIG. 1. FIG. 1 sets forth a functional block diagram of an example system useful for detecting an increase in thermal resistance of a heat sink in a computer system according to embodiments of the present invention. Thermal resistance is the reciprocal of thermal conductance and defines a resistance to heat flow through a structure, typically calculated as the temperature difference across a structure when a unit of heat energy flows through the structure in unit time. Thermal resistance then may be expressed in degrees Celsius per watt, or Kelvins per watt. The greater the thermal resistance of a heat sink, the less the heat sink is capable of dissipating heat and vice versa.

A heat sink is a device that absorbs and dissipates heat from another object using thermal contact, either direct or radiant. Heat sinks are used in a wide range of applications wherever efficient heat dissipation is useful such as, for example, refrigeration, heat engines, electronic devices, and lasers. The example computer (152) of FIG. 1 may include one or more heat sinks (110). The example heat sink (110) of FIG. 1 may dissipate heat for any component of the computer (152) such as the processor (156), video adapter (209), RAM (168), flash memory (134), and so on. The computer (152) may also include one or more fans (116) that control airflow across the heat sink (110).

The computer system (152), more specifically, the heat sink (110) in the example of FIG. 1 includes a temperature monitoring device. A temperature monitoring device is a device configured to measure temperature of various portions of the heat sink, such as the case temperature of the heat sink, ambient temperature around the heat sink, wireline temperature one or more traces connecting the heat sink to a printed circuit board, and so on as will occur to those of skill in the art. Such a temperature monitoring device may be implemented as a silicon bandgap temperature sensor, a thermistor, a digital thermometer, and so on. The temperature monitoring device (112) may constantly monitor temperatures, periodically monitor and report temperatures upon a predefined time interval, monitor temperatures upon request only, or in other ways as will occur to those of skill in the art.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a monitoring module (126), a module of computer program instructions capable of detecting an increase in thermal resistance of the heat sink (110) in the computer system (152) according to embodiments of the present invention. The monitoring module detects an increase in thermal resistance of the heat sink (110) in the computer system (152) according to embodiments of the present invention by: measuring, by the monitoring module through use of the temperature monitoring device (112) during operation of the computer system (152), thermal resistance of the heat sink. Measuring the thermal resistance of the heat sink during operation of the computer (152) may be carried out by receiving one or more temperature values from the temperature monitoring device (112) through the out-of-band bus (120) and service processor (118). Such an out-of-band bus may be implemented as an I²C bus, a System Management Bus ('SMBus'), a Serial Peripheral Interface Bus ('SPI'), Joint Test Action Group ('JTAG') connection, Small Computer System Interface ('SCSI') connection, or any other data communications link as will occur to those of skill in the art. The monitoring module also includes computer program instructions capable of determining whether the measured thermal resistance of the heat sink is greater than a threshold thermal resistance, the threshold thermal resistance stored in a thermal profile in non-volatile memory, such as Flash memory (134) or non-volatile memory of the heat sink, and if the measured thermal resistance of the heat sink is greater than the threshold thermal resistance, notifying a system administrator.

Also stored in RAM (168) is an operating system (154). Operating systems useful in a systems that detect an increase in thermal resistance of a heat sink in a computer system according to embodiments of the present invention include UNIX™, Linux™, Microsoft XP™, Microsoft Vista™, AIX™, IBM's i5/OS™, and others as will occur to those of skill in the art. The operating system (154) and the software application (126) in the example of FIG. 1 are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for detecting an increase in thermal resistance of a heat sink in a computer system according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers, such as the server (106), personal computer (108), and workstation (104) in the example of FIG. 1, and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for detecting an increase in thermal resistance of a heat sink in a computer system according to embodiments of the present invention include modems for wired dial-up communications, Ethernet (IEEE 802.3) adapters for wired data communications network communications, and 802.11 adapters for wireless data communications network communications.

The arrangement of servers, computers, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
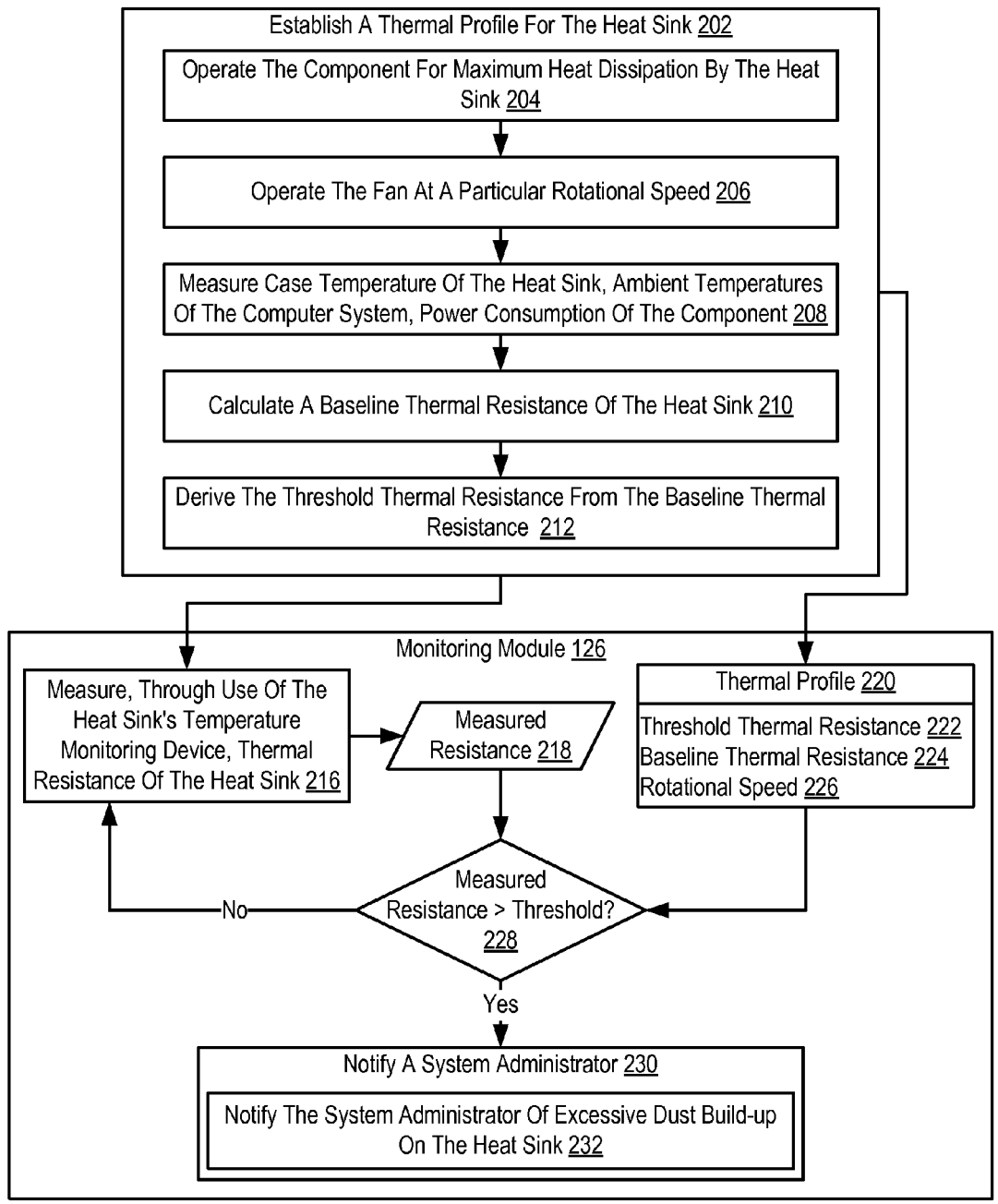
FIG. 2 sets forth a flow chart illustrating an exemplary method for detecting an increase in thermal resistance of a heat sink in a computer system according to embodiments of the present invention.

For further explanation, FIG. 2 sets forth a flow chart illustrating an exemplary method for detecting an increase in thermal resistance of a heat sink in a computer system according to embodiments of the present invention. The method of FIG. 2 is implemented in a computer system similar to the computer (152) in the example of FIG. 1 in that like the example of FIG. 1, the heat sink of the method of FIG. 2 dissipates heat for a component of the computer system, the computer system includes a fan that controls airflow across the heat sink, and the computer system also includes a temperature monitoring device.

The method of FIG. 2 includes establishing (202) a thermal profile (220) for the heat sink. A thermal profile is a data structure containing information describing thermal characteristics of the heat sink such as, a typical baseline thermal resistance (224), a threshold thermal resistance (222), current, voltage, and rotational speeds (22) of tests used to derive such baseline and threshold thermal resistances, and so on. A baseline thermal resistance is a characteristic thermal resistance of a heat sink measured when the heat sink is dissipating a peak amount of heat under typical conditions. The term 'peak' refers to the amount of heat generated by the component under typical, but maximum operating conditions.

Establishing (202) a thermal profile (220) for the heat sink may be carried out by a manufacturer of the heatsink or by a manufacturer of the computer system in a dust-free environment. Establishing a thermal profile in such a dust-free environment increases the probability that the measured baseline thermal resistance of the heat sink may be used as a comparison point to identify excessive dust build-up during operation of the heat sink.

Establishing a thermal profile may be carried out by a utility, a module of computer program instructions that tests computer system and heat sink operating characteristics to determine a thermal resistance. Establishing (202) a thermal profile (220) for the heat sink may include operating (204) the component for maximum heat dissipation by the heat sink. Operating a component for maximum heat dissipation by the heat sink may include providing a constant, peak power to the component in order to cause the component to generate heat. Power here is referred to as peak with respect to the components maximum rated power. That is, the component is operated at its maximum rated power, a possible typical condition that may occur during operation of the computer system.

Establishing a thermal profile may also include operating (206) the fan at a particular rotational speed. Operating the fan at a particular rotational speed enables a standard operating condition against which to test. Such particular rotational speed, as described below in more detail, may be used, for example, to measure the thermal resistance of the heat sink during operation of the computer system.

Establishing a thermal profile may also include measuring (208) case temperature of the heat sink, ambient temperature of the computer system, and power consumption of the component. Case temperature of the heat sink is the temperature of the physical enclosure of the heat sink, the surface area through which heat is dissipated. Ambient temperature of the computer system is the temperature of the air inside the computer system, not the temperature of any component. Such ambient temperature may be measured by the temperature monitoring device, or another temperature monitoring device in the computer system. Power consumption of the component may be measured by determining the amount of power draw from a power supply of the computer system that supplies power to the component, or by expressly controlling the amount of power provided to the component.

Establishing a thermal profile may also include calculating (210) a baseline thermal resistance of the heat sink; and deriving (212) a threshold thermal resistance from the baseline thermal resistance. As mentioned above, a baseline thermal resistance is a characteristic thermal resistance of a heat sink measured when the heat sink is dissipating a peak amount of heat under typical conditions. Calculating (210) a baseline thermal resistance (224) of the heat sink may be carried out by determining the ratio of: the difference in case temperature of the heat sink and ambient temperature in the computer system; and power consumption of the component.

A threshold thermal resistance may be a defined value, such as 1.25 K/W, or some percentage of the baseline thermal resistance of the heatsink, such as five percent less than the baseline thermal resistance. Deriving (212) a threshold thermal resistance (222) from the baseline thermal resistance (224) may be carried out in various ways including, calculating a defined value, selecting a percentage in dependence upon ranges of baseline thermal resistances, and so on.

The method of FIG. 2 also includes measuring (216), by a monitoring module (126) through use of the temperature monitoring device during operation of the computer system, thermal resistance of the heat sink. The monitoring module (126) may include a utility, similar to the utility mentioned above capable of establishing a thermal profile, for measuring (216) thermal resistance of the heat sink. Measuring (216) thermal resistance of the heat sink according to embodiments of the present invention may be carried out by: operating the component for maximum heat dissipation by the heat sink; operating the fan at a particular rotational speed; measuring case temperature of the heat sink where the heat sink makes contact with the component, ambient temperatures of the computer system, power consumption of the component; and calculating current thermal resistance of the heat sink. The particular rotational speed (226) may be a value stored in non-volatile memory of the computer system when the thermal profile is established such as, for example, a value stored in the thermal profile itself when the profile was established. Such a particular rotational speed enables accurate measurement of the current thermal resistance of the heat sink for comparison to a threshold thermal resistance derived using the same rotational speed.

The method of FIG. 2 also includes determining (228) whether the measured thermal resistance (218) of the heat sink is greater than the threshold thermal resistance (222). Determining whether the measured thermal resistance of the heat sink is greater than the threshold thermal resistance may be carried out by comparing the two values or calculating a definite threshold thermal resistance, from a threshold thermal resistance expressed as a percentage of the baseline and then comparing the two values. If the measured thermal resistance of the heat sink is not greater than the threshold thermal resistance, the method of FIG. 2 continues by again measuring (216) the thermal resistance of the heat sink (216). Such iterations of measurements and determinations may be carried out at periodic intervals or upon request by a processor in the computer system. If the measured thermal resistance of the heat sink is greater than the threshold thermal resistance, the method of FIG. 2 continues by notifying (230) a system administrator. More specifically, in the method of FIG. 2, notifying (230) a system administrator may also include notifying (232) the system administrator of excessive dust build-up on the heat sink. A system administrator as the term is used in this specification refers to any user of the computer system that is capable of removing dust from components, such as the heat sink, of the computer system.

Exemplary embodiments of the present invention are described largely in the context of a fully functional computer system for detecting an increase in thermal resistance of a heat sink in a computer system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of detecting an increase in thermal resistance of a heat sink in a computer system, the heat sink dissipating heat for a component of the computer system, the computer system comprising a fan controlling airflow across the heat sink, the computer system further comprising a temperature monitoring device, the method comprising:

measuring, by a monitoring module through use of the temperature monitoring device during operation of the computer system, thermal resistance of the heat sink;

determining whether the measured thermal resistance of the heat sink is greater than a threshold thermal resistance, the threshold thermal resistance stored in a thermal profile in non-volatile memory; and if the measured thermal resistance of the heat sink is greater than the threshold thermal resistance, notifying a system administrator.

2. The method of claim 1 further comprising establishing the thermal profile for the heat sink including:

operating the component for maximum heat dissipation by the heat sink;

operating the fan at a particular rotational speed;

measuring case temperature of the heat sink, ambient temperature of the computer system, power consumption of the component;

calculating a baseline thermal resistance of the heat sink; and deriving the threshold thermal resistance from the baseline thermal resistance.

3. The method of claim 2 wherein establishing a thermal profile for the heat sink further comprises:

establishing the thermal profile by a manufacturer of the heat sink in a dust-free environment.

4. The method of claim 1 wherein measuring thermal resistance of the heat sink further comprises:

operating the component for maximum heat dissipation by the heat sink;

operating the fan at a particular rotational speed;

measuring case temperature of the heat sink, ambient temperature of the computer system, power consumption of the component; and calculating current thermal resistance of the heat sink.

5. The method of claim 4 wherein the particular rotational speed comprises a value stored in non-volatile memory of the computer system when the thermal profile is established.

6. The method of claim 1 wherein the notifying a system administrator further comprises notifying the system administrator of excessive dust build-up on the heat sink.

7. An apparatus for detecting an increase in thermal resistance of a heat sink in a computer system, the heat sink dissipating heat for a component of the computer system, the computer system comprising a fan controlling airflow across the heat sink, the computer system further comprising a temperature monitoring device, the apparatus comprising a computer processor, a computer memory operatively coupled to the computer processor, the computer memory having disposed within it computer program instructions capable of:

measuring, by a monitoring module through use of the temperature monitoring device during operation of the computer system, thermal resistance of the heat sink;

determining whether the measured thermal resistance of the heat sink is greater than a threshold thermal resistance, the threshold thermal resistance stored in a thermal profile in non-volatile memory; and if the measured thermal resistance of the heat sink is greater than the threshold thermal resistance, notifying a system administrator.

8. The apparatus of claim 7 further comprising computer program instructions capable of establishing the thermal profile for the heat sink including:

operating the component for maximum heat dissipation by the heat sink;

operating the fan at a particular rotational speed;

measuring case temperature of the heat sink, ambient temperature of the computer system, power consumption of the component;

calculating a baseline thermal resistance of the heat sink; and deriving the threshold thermal resistance from the baseline thermal resistance.

9. The apparatus of claim 8 wherein establishing a thermal profile for the heat sink further comprises:

establishing the thermal profile by a manufacturer of the heat sink in a dust-free environment.

10. The apparatus of claim 7 wherein measuring thermal resistance of the heat sink further comprises:

operating the component for maximum heat dissipation by the heat sink;

operating the fan at a particular rotational speed;

measuring case temperature of the heat sink, ambient temperature of the computer system, power consumption of the component; and calculating current thermal resistance of the heat sink.

11. The apparatus of claim 10 wherein the particular rotational speed comprises a value stored in non-volatile memory of the computer system when the thermal profile is established.

12. The apparatus of claim 7 wherein the notifying a system administrator further comprises notifying the system administrator of excessive dust build-up on the heat sink.

13. A computer program product for detecting an increase in thermal resistance of a heat sink in a computer system, the heat sink dissipating heat for a component of the computer system, the computer system comprising a fan controlling airflow across the heat sink, the computer system further comprising a temperature monitoring device, the computer program product disposed in a computer readable, recordable medium, the computer program product comprising computer program instructions capable of:

measuring, by a monitoring module through use of the temperature monitoring device during operation of the computer system, thermal resistance of the heat sink;

determining whether the measured thermal resistance of the heat sink is greater than a threshold thermal resistance, the threshold thermal resistance stored in a thermal profile in non-volatile memory; and if the measured thermal resistance of the heat sink is greater than the threshold thermal resistance, notifying a system administrator.

14. The computer program product of claim 13 further comprising computer program instructions capable of establishing the thermal profile for the heat sink including:

operating the component for maximum heat dissipation by the heat sink;

operating the fan at a particular rotational speed;

measuring case temperature of the heat sink, ambient temperature of the computer system, power consumption of the component;

calculating a baseline thermal resistance of the heat sink; and deriving the threshold thermal resistance from the baseline thermal resistance.

15. The computer program product of claim 14 wherein establishing a thermal profile for the heat sink further comprises:

establishing the thermal profile by a manufacturer of the heat sink in a dust-free environment.

16. The computer program product of claim 13 wherein measuring thermal resistance of the heat sink further comprises:

operating the component for maximum heat dissipation by the heat sink;

operating the fan at a particular rotational speed;

measuring case temperature of the heat sink, ambient temperature of the computer system, power consumption of the component; and calculating current thermal resistance of the heat sink.

17. The computer program product of claim 16 wherein the particular rotational speed comprises a value stored in non-volatile memory of the computer system when the thermal profile is established.

18. The computer program product of claim 13 wherein the notifying a system administrator further comprises notifying the system administrator of excessive dust build-up on the heat sink.

* * * * *